(12) United States Patent
Sarkar et al.

(10) Patent No.: US 10,731,991 B2
(45) Date of Patent: Aug. 4, 2020

(54) METHOD AND DEVICE FOR DETERMINING NAVIGATION OF A VEHICLE BASED ON FEASIBILITY OF EVENTS

(71) Applicant: Wipro Limited, Bangalore (IN)

(72) Inventors: Arnik Sarkar, Murshidabad (IN); Sayanshree Ghosh, Asansol (IN); Pranab Ghosh, Kolkata (IN)

(73) Assignee: Wipro Limited, Bangalore (IN)

( * ) Notice: Subject to any disclaimer, the term of this patent is extended or adjusted under 35 U.S.C. 154(b) by 242 days.

(21) Appl. No.: 15/720,518

(22) Filed: Sep. 29, 2017

(65) Prior Publication Data

US 2019/0056229 A1    Feb. 21, 2019

(30) Foreign Application Priority Data

Aug. 16, 2017  (IN) .............................. 201741029035

(51) Int. Cl.
| | |
|---|---|
| *G01C 21/20* | (2006.01) |
| *G01C 21/34* | (2006.01) |
| *G01C 21/36* | (2006.01) |
| *G06Q 10/10* | (2012.01) |
| *G08G 1/0968* | (2006.01) |

(52) U.S. Cl.
CPC .......... *G01C 21/20* (2013.01); *G01C 21/343* (2013.01); *G01C 21/3484* (2013.01); *G01C 21/362* (2013.01); *G01C 21/3655* (2013.01); *G06Q 10/109* (2013.01); *G06Q 10/1093* (2013.01); *G08G 1/096833* (2013.01); *G08G 1/096827* (2013.01)

(58) Field of Classification Search
CPC .................................................. G01C 21/3484
See application file for complete search history.

(56) References Cited

U.S. PATENT DOCUMENTS

| | | | |
|---|---|---|---|
| 6,732,080 B1 | 5/2004 | Blants | |
| 7,941,133 B2 | 5/2011 | Aaron et al. | |
| 7,941,753 B2 | 5/2011 | Meisels et al. | |
| 8,457,883 B2 | 6/2013 | Chen et al. | |
| 8,504,404 B2* | 8/2013 | Norton | G01C 21/3407 705/7.19 |
| 8,825,362 B2* | 9/2014 | Kirsch | G01C 21/362 701/33.4 |
| 9,174,648 B2 | 11/2015 | Luong | |
| 2007/0150174 A1 | 6/2007 | Seymour et al. | |
| 2012/0010805 A1 | 1/2012 | Wilkerson | |
| 2014/0108307 A1* | 4/2014 | Raghunathan | G06N 20/00 706/12 |

(Continued)

*Primary Examiner* — Todd Melton
(74) *Attorney, Agent, or Firm* — Finnegan, Henderson, Farabow, Garrett & Dunner, LLP (57) ABSTRACT

The present disclosure relates to method and device for determining navigation of a vehicle based on feasibility of events by a navigation device. The navigation device comprises receiving events data associated with a user of the vehicle from one or more sources, determining one or more events associated with the user, based on at least one of the events data and a pre-defined template data, determining in real-time, feasibility to reach the one or more events based on a set of parameters, scheduling the one or more events based on the determination and determining navigation of the vehicle based on the one or more scheduled events.

27 Claims, 7 Drawing Sheets

(56) References Cited

U.S. PATENT DOCUMENTS

| | | | |
|---|---|---|---|
| 2014/0278057 A1* | 9/2014 | Berns | G01C 21/3484 |
| | | | 701/410 |
| 2015/0169528 A1* | 6/2015 | Sjogreen | G06Q 10/1095 |
| | | | 715/227 |
| 2015/0281920 A1 | 10/2015 | Dhanyamraju et al. | |
| 2015/0350842 A1* | 12/2015 | Huang | H04W 4/029 |
| | | | 455/456.3 |
| 2016/0153798 A1* | 6/2016 | Barraci | G06F 16/29 |
| | | | 701/425 |
| 2016/0342952 A1* | 11/2016 | Yasuda | G06Q 10/1095 |
| 2017/0228701 A1* | 8/2017 | Wosk | G01C 21/3484 |
| 2018/0188695 A1* | 7/2018 | Kumar | H04W 4/029 |

* cited by examiner

METHOD AND DEVICE FOR DETERMINING NAVIGATION OF A VEHICLE BASED ON FEASIBILITY OF EVENTS

This application claims the benefit of Indian Patent Application Serial No. 201741029035, filed Aug. 16, 2017, which is hereby incorporated by reference in its entirety.

FIELD

The present subject matter is related in general to the field of navigation system, more particularly, but not exclusively to method and device for determining navigation of a vehicle based on feasibility of events.

BACKGROUND

Today, everyone has a busy schedule both personally and professionally. Advancement in technology has made scheduling of appointments easy, as most of services today can be scheduled online. For instance, from entertainment to transportation, from emergency services to tourism and the like. It is not always possible for a user to remember all engagements and schedules including correct time, venue, route direction and road conditions all the time. For example, a user may have a booking confirmation, or some previously decided appointments. However, when the user is supposed to go for the appointment, factors such as, time, venue, traffic condition, destination delays and the like, may lead to failure in attending the appointment.

Most of existing automotive infotainment systems guide users in reaching a destination based on traffic condition and weather details. However, the existing automotive infotainment systems do not provide an alert option to users for any pre-booked appointments. Particularly, users need to go to navigation screen of the infotainment system and manually type destination at start of a journey to get route guidance. Also, while travelling, there is no provision to know in real-time, if any appointments may be missed by the user based on change in route or addition of waypoint. For example, consider a user is running late to attend a music concert, which could not be rescheduled for a single person. Suppose the user adds a waypoint or point of interest on way to the music concert, the user is not notified about possibility of missing the music concert due to the added waypoint. Also, in case a user forgets about any confirmed booking and schedules another appointment at a conflicting time or place, the existing automotive infotainment system does not indicate about the conflicts to the users Also, the present systems do no resolve the conflicting events based on type and importance of the events. For example, suppose a user books a doctor's appointment a month back, and forgets about the appointment and books a movie in an overlapping time zone. In such case, conflict of schedules occurs and the user may miss a high priority appointment, i.e. doctor's appointment in this case. Thus, the existing automotive infotainment systems in vehicles do not facilitate users in managing events.

The information disclosed in this background of the disclosure section is only for enhancement of understanding of the general background of the technology and should not be taken as an acknowledgement or any form of suggestion that this information forms the prior art already known to a person skilled in the art.

SUMMARY

In an embodiment, the present disclosure relates to a method for determining navigation of a vehicle based on feasibility of events. The method comprises receiving events data associated with a user of the vehicle from one or more sources, determining one or more events associated with the user, based on at least one of the events data and a pre-defined template data, determining in real-time feasibility to reach the one or more events based on a set of parameters, scheduling the one or more events based on the determination and determining navigation of the vehicle based on the one or more scheduled events.

In an embodiment, the present disclosure relates to a navigation device for determining navigation of a vehicle based on feasibility of events. The navigation device comprises a processor and a memory communicatively coupled to the processor, where the memory stores processor executable instructions, which, on execution, may cause the navigation device to receive events data associated with a user of the vehicle from one or more sources, determine one or more events associated with the user, based on at least one of the events data and a pre-defined template data, determine in real-time feasibility to reach the one or more events based on a set of parameters, schedule the one or more events based on the determination and determine navigation of the vehicle based on the one or more scheduled events.

In an embodiment, the present disclosure relates to a non-transitory computer readable medium including instructions stored thereon that when processed by at least one processor may cause a navigation device to receive events data associated with a user of the vehicle from one or more sources, determine one or more events associated with the user, based on at least one of the events data and a pre-defined template data, determine in real-time feasibility to reach the one or more events based on a set of parameters, schedule the one or more events based on the determination and determine navigation of the vehicle based on the one or more scheduled events.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

The accompanying drawings, which are incorporated in and constitute a part of this disclosure, illustrate exemplary embodiments and, together with the description, serve to explain the disclosed principles. In the figures, the left-most digit(s) of a reference number identifies the figure in which the reference number first appears. The same numbers are used throughout the figures to reference like features and components. Some embodiments of system and/or methods in accordance with embodiments of the present subject matter are now described, by way of example only, and with reference to the accompanying figures, in which.

It should be appreciated by those skilled in the art that any block diagrams herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and executed by a computer or processor, whether or not such computer or processor is explicitly shown.

DETAILED DESCRIPTION

In the present document, the word "exemplary" is used herein to mean "serving as an example, instance, or illustration." Any embodiment or implementation of the present subject matter described herein as "exemplary" is not necessarily to be construed as preferred or advantageous over other embodiments.

While the disclosure is susceptible to various modifications and alternative forms, specific embodiment thereof has been shown by way of example in the drawings and will be described in detail below. It should be understood, however that it is not intended to limit the disclosure to the particular forms disclosed, but on the contrary, the disclosure is to cover all modifications, equivalents, and alternative falling within the spirit and the scope of the disclosure.

The terms "comprises", "comprising", or any other variations thereof, are intended to cover a non-exclusive inclusion, such that a setup, device or method that comprises a list of components or steps does not include only those components or steps but may include other components or steps not expressly listed or inherent to such setup or device or method. In other words, one or more elements in a system or apparatus proceeded by "comprises . . . a" does not, without more constraints, preclude the existence of other elements or additional elements in the system or method.

In the following detailed description of the embodiments of the disclosure, reference is made to the accompanying drawings that form a part hereof, and in which are shown by way of illustration specific embodiments in which the disclosure may be practiced. These embodiments are described in sufficient detail to enable those skilled in the art to practice the disclosure, and it is to be understood that other embodiments may be utilized and that changes may be made without departing from the scope of the present disclosure. The following description is, therefore, not to be taken in a limiting sense.

The present disclosure relates to a method and a navigation device for determining navigation of a vehicle based on feasibility of events. In an embodiment, the navigation device may be present in the vehicle infotainment system. In another embodiment, the navigation device may be communicatively connected to the vehicle infotainment system. Initially, when a user starts driving the vehicle, the navigation device associated with the vehicle may receive events data associated with the user from one or more sources. In an embodiment, the events data may include, but not limited to, details of Short Message Services (SMS), electronic mail messages, multimedia data, calendar events and social networking content associated with the user and the like. In an embodiment, the one or more sources of the events data may include, a user device to which the navigation device is connected and a user data server. The events data associated with the user may be mapped with data of one or more service providers to determine one or more events associated with the users. The one or more events may either be scheduled events or unscheduled events. In an embodiment, the unscheduled events may refer to the events which is not yet scheduled by the navigation device. The unscheduled events may be determined from a real-time communication data from a third party or service providers. In an embodiment, the scheduled events are the events that have been scheduled by the navigation device at a prior time. While routing the vehicle, the navigation device checks feasibility to reach the one or more events based on a set of parameters. The set of parameters may include, but are not limited to, start time of the user for an event, one or more point of interest enroute to the event, distance of the event from a current location of the user, consecutive distance between two events, real-time traffic and weather condition at the current location and on way to the event, type of the event, estimate time for scheduled event, real-time update on the one or more events by one or more registered service providers, conflict with the scheduled event and priority of the event.

In an embodiment, priority of an event may be set by the user or may be pre-determined by the navigation device. In some embodiments, the priority may be set based on the nature of the event, such as capability of an event time to be rescheduled. For example, a movie show time may not be reschedulable at the user's preference hence may have higher priority over meeting a person. In some embodiments, the priority of events may be set based on the category of the events. In some embodiments, events may be categorized into groups based on their type and priority to the events may be set accordingly. For example, doctor's appointment, hospital visit, dental appointments, physiotherapy appointments and the like may be grouped under health events and may be given higher priority over other events. Events such as meeting a friend, movie show, music concert and the like may be grouped under the category of "leisure" and may be given a lower priority over events that fall under the category of "health".

Based on the feasibility, the one or more events may be scheduled. Scheduling the one or more events may include, rescheduling events which are scheduled by the user when reaching the events may not be feasible as per the user's schedule. Also, scheduling the one or more events may include scheduling unscheduled events which may be feasible to attend. In an embodiment, scheduling the one or more events may include setting up of an upcoming event destination for navigation, by the navigation device. Based on the one or more scheduled events, navigation of the vehicle may be determined. The present disclosure provides driving assistance to users by checking feasibility to reach events based on different parameters.

Figure 1:
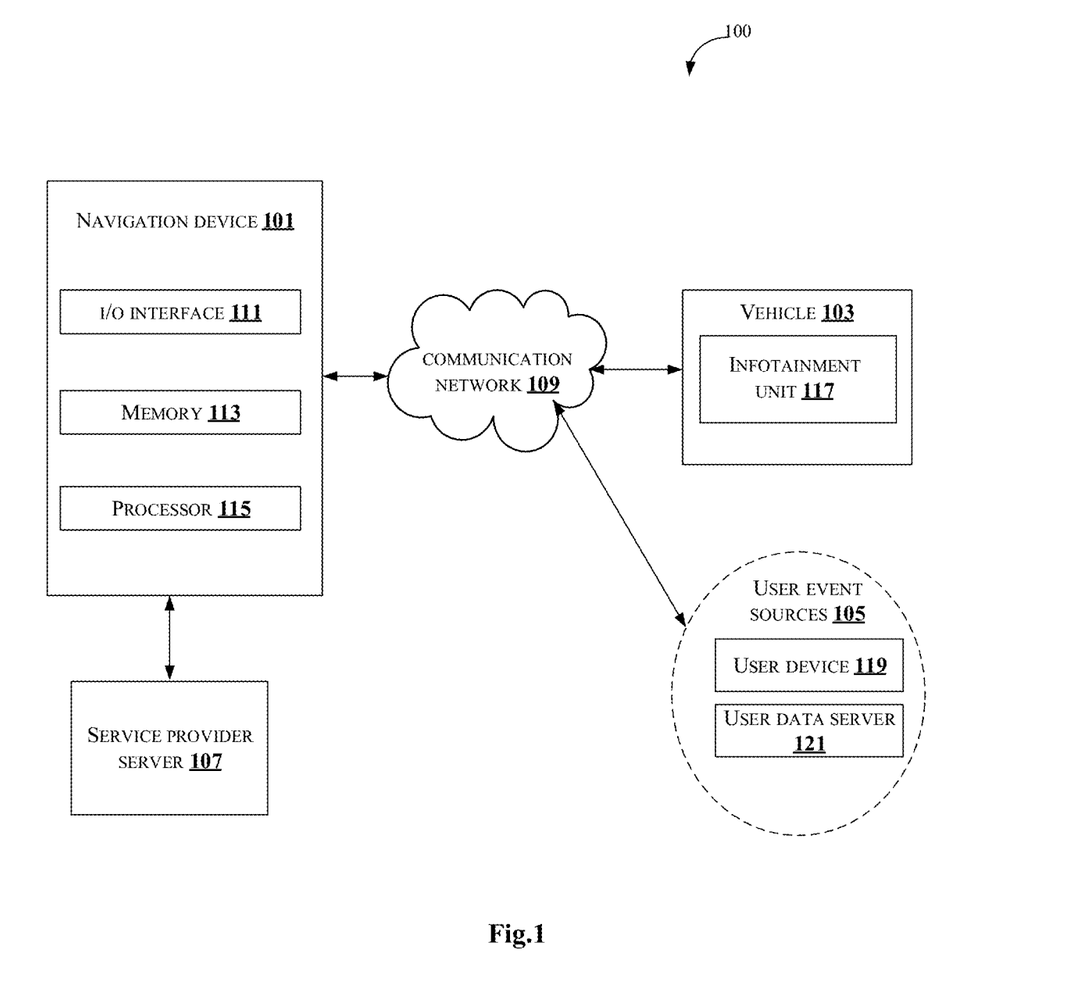
FIG. 1 illustrates an exemplary environment for determining navigation of a vehicle based on feasibility of events in accordance with some embodiments of the present disclosure.

FIG. 1 illustrates an exemplary environment for determining navigation of a vehicle based on feasibility of events in accordance with some embodiments of the present disclosure.

As shown in FIG. 1, the environment 100 includes a navigation device 101 connected through a communication network 109 to a vehicle 103 and user event sources 105

(also referred as one or more sources). In an embodiment, the vehicle 103 may refer to any automobile which encompasses an infotainment unit. The navigation device 101 is connected through a communication network (not shown explicitly) to a service provider server 107. In an embodiment, the service provider server 107 is a web server to which different service providers may be registered. The communication network 109 may include, but is not limited to, a direct interconnection, an e-commerce network, a Peer to Peer (P2P) network, Local Area Network (LAN), Wide Area Network (WAN), wireless network (e.g., using Wireless Application Protocol), Internet, Wi-Fi and the like. The vehicle 103 may comprise an infotainment unit 117. A person skilled in the art would understand that the vehicle 103 may contain other units, not mentioned explicitly in the present disclosure. The user event sources 105 may include a user device 119 and a user data server 121. In an embodiment, the user device 119 may include, but is not limited to, a laptop, a desktop computer, a Personal Digital Assistant (PDA), a notebook, a smartphone, a tablet, a server and any other computing devices. A person skilled in the art would understand that, any other devices, not mentioned explicitly, may also be used in the present disclosure. In an embodiment, the user data server 121 may refer to a web server, which the user may use for communication and social media. In an embodiment, the user data server 121 may include, but is not limited to, email servers, and social networking servers. The navigation device 101 may determine navigation of the vehicle 103 based on feasibility of events.

Initially, when a user starts the vehicle 103, the navigation device 101 may receive events data associated with the user from one or more user event sources 105. In an embodiment, the events data may include, but are not limited to, details of Short Message Services (SMS), electronic mail messages, multimedia data, calendar events and social networking content associated with the user. A person skilled in the art would understand that any other events, not mentioned explicitly may also be included in the present disclosure. Based on the events data and a pre-defined template data, one or more events associated with the user may be determined. In an embodiment, the pre-defined template data is associated with service providers. In an embodiment, the pre-defined template data may include social media exchange template format of the service providers. The navigation device 101 may fetch data associated with one or more registered service providers from the service provider server 107 based on a current location of the vehicle 103. In an embodiment, the current location of the vehicle 103 may be fetched from the infotainment unit 117 of the vehicle 103. For example, the infotainment unit 117 comprises a location tracking unit (not shown in the Figures) which may provide the current location of the vehicle 103. In an embodiment, the data associated with the one or more registered service providers may include, but are not limited to, registered service provider name, communication method details and the pre-defined template data. A person skilled in the art would understand that any other data associated with the service providers may also be included in the present disclosure. In an embodiment, the one or more events associated with the user may include at least one of scheduled and unscheduled events.

Once the navigation device 101 determines the one or more events associated with the user, a set of parameters may be analyzed to check feasibility of the vehicle 103 to reach the one or more events. In an embodiment, the set of parameters may include, start time of the user for an event, one or more point of interest enroute to the event, distance of the event from a current location of the user, consecutive distance between two events, type of the event, estimate time for the scheduled event, real-time traffic and weather condition at the current location and on way to the event, real-time update on the one or more event by a registered service provider, conflict with the scheduled event and priority of the event. A person skilled in the art would understand that any other parameters for determining not mentioned explicitly, may also be included in the present disclosure. In an embodiment, after determining the feasibility to reach the one or more events, the navigation device 101 may identify one or more point of interest, added by the user enroute to the scheduled event, one or more events conflicting with each other, a change in route of the scheduled event, a change in the real-time traffic condition on way to the schedule events, a change in time of the scheduled event and a real-time update on the one or more event by the associated one or more registered service providers. In such cases, the navigation device 101 may recalculate the feasibility to reach the one or more events. In an embodiment, the one or more events may be said to be conflicting if, two or more events are scheduled at same time and if events are infeasible to reach based on at least one of, distance of the scheduled event from current location, distance between two consecutive scheduled events and real-time traffic and weather condition at the current location and on way to the scheduled events. For example, a user may have booked a doctor's appointment a months ago. However, the user forgets about the doctor's appointment and books a movie at the same, which conflicts the doctor's appointment. A person skilled in the art would understand that, any other situation, not disclosed explicitly, which may lead to conflict between two events may also be included in the present disclosure. Further, once the feasibility to reach the one or more events is determined, the navigation device 101 may schedule the one or more events and determine a navigation for the vehicle 103 based on the one or more scheduled events. In an embodiment, on determining the feasibility, if the navigation device 101 identifies that one or more events may not be feasible to reach, the navigation device 101 may reschedule the scheduled event. In an embodiment, the navigation device 101 may provide alerts to users regarding feasibility to reach the one or more events. In an embodiment, path for vehicles such as, autonomous vehicles, may be selected automatically based on the feasibility determination. In an embodiment, the alerts may be provided on a display unit (not shown in FIG. 1) present in the infotainment unit 117 of the vehicle 103. In an embodiment, the alerts may be provided to the users on the user device 119. In an embodiment, scheduling the one or more events may also include scheduling the unscheduled events based on the feasibility.

In an embodiment, the navigation device 101 may display a route guidance and time estimate on the display unit of the infotainment unit 117 in the vehicle 103 to reach the one or more scheduled events and one or more rescheduled events. In an embodiment, the navigation unit 101 may display the route guidance and the time estimate on the user device 119.

The navigation device 101 may include an I/O Interface 111, a memory 113 and a processor 115. The I/O interface 111 may be configured to receive events data associated with the user from the user events sources 105. The I/O interface 111 may receive the current location of the vehicle 103 from the infotainment unit 117 of the vehicle 103, provided by the location tracking unit of the vehicle 103. The I/O interface 111 may also receive data associated with the one or more registered service providers from the service provider server 107. The I/O interface 111 may provide the alerts, the route guidance and time estimate to the infotainment unit 117 of the vehicle 103 for displaying to the user.

The information received from the I/O interface 111 may be stored in the memory 113. The memory 113 may be communicatively coupled to the processor 115 of the navigation device 101. The memory 113 may also store processor instructions which may cause the processor 115 to execute the instructions for determining navigation of the vehicle 103 based on feasibility of events.

Figure 2A:
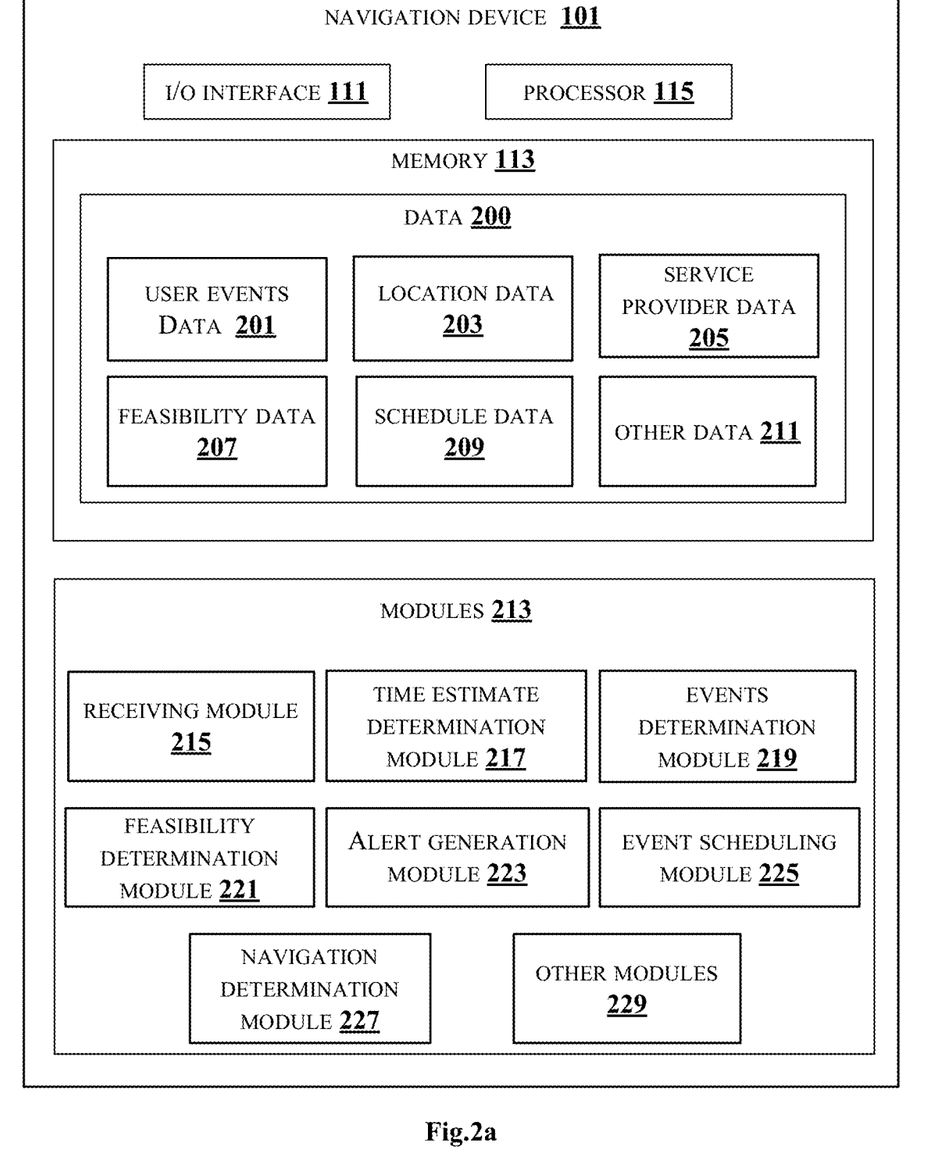
FIG. 2a shows a detailed block diagram of a navigation device in accordance with some embodiments of the present disclosure.

FIG. 2a shows a detailed block diagram of a navigation device in accordance with some embodiments of the present disclosure.

Data 200 and one or more modules 213 of the navigation device 101 are described herein in detail. In an embodiment, the data 200 may include user events data 201, location data 203, service provider data 205, feasibility data 207, schedule data 209 and other data 211.

The user events data 201 may include details about events associated with the user of the vehicle 103. The user events data 201 may include, details of Short Message Services (SMS), Electronic Mail (Email) messages, multimedia data, calendar events and social networking content associated with the user. For example, events data for a user may include an email from a hospital regarding confirmation of an appointment, a SMS regarding a party from a friend and the like. The user events data 201 may be received from at least the user device 119 and the user data server 121. For example, details of SMSs, multimedia, calendar event may be received from the user device 119 through one or more communication medium such as, Bluetooth and the like. Details regarding emails and social networking content may be received through the user data server 121 such as, mail servers and social media servers. Further, the user events data 201 may include details about the one or more events which may be determined for the user based on the events data and the data of the one or more registered service providers. In an embodiment, the user events data 201 may include a queue of locations associated with the one or more events scheduled for a day along with corresponding timing information. In an embodiment, the one or more events may include scheduled events and unscheduled events.

The location data 203 may include current location details of the vehicle 103. In an embodiment, the current location details may be received from the infotainment unit 117 of the vehicle 103, generated by the location tracking unit of the vehicle 103.

The service provider data 205 may include data associated with the one or more registered service providers. The data may include, registered service provider's name, communication method details and the pre-defined template data. For example, the template of the communication message may be, "table booked at <Name>, <Location>, on <Date> <Time>" and the like. A person skilled in the art would understand that any other data of the service provider, not mentioned explicitly, may also be included in the present disclosure. In an embodiment, the service provider data 205 may be received from the service provider server 107 based on the current location of the vehicle 103.

The feasibility data 207 may include details about feasibility of the user to reach the one or more events. The feasibility may be determined based on the set of parameters. The feasibility data 207 may contain information about the set of parameters such as, start time of the user for an event, one or more point of interest which the user may include enroute to the event, distance of the event from the current location of the user, consecutive distance between two events, type of the event, estimate time for the scheduled event, if any, real-time traffic and weather condition at the current location and on way to the event, real-time update on the one or more event by a registered service provider, conflict with the scheduled event and priority of the event. Further, the feasibility data 207 may include details about recalculated feasibility of the vehicle 103 for reaching the one or more scheduled events. The details about the recalculated feasibility may include at least one of, one or more point of interest, added by the user, and to be covered enroute to the scheduled event, one or more conflicting scheduled events, change in route of the scheduled event, change in the real-time traffic condition on way to the schedule events, change in time of the scheduled event and real-time update on the one or more event by a registered service provider. The feasibility data 207 may include details associated with the one or more conflicting scheduled events, events which may be scheduled at same time and events which are infeasible to reach based on at least one of distance of the scheduled event from current location, distance between two consecutive scheduled events and real-time traffic and weather condition at the current location and on way to the scheduled events.

The schedule data 209 may include details about the one or more events which may be scheduled based on the feasibility determination. In an embodiment, scheduling may include rescheduling one or more scheduled events and scheduling one or more unscheduled events. The details may include information about scheduled events which may be rescheduled based on the feasibility. The details may also include information about one or more unscheduled events which may be scheduled based on the feasibility. Further, the schedule data 209 may include route guidance and time estimate to reach the one or more scheduled events.

The other data 211 may store data, including temporary data and temporary files, generated by modules 213 for performing the various functions of the navigation device 101.

In an embodiment, the data 200 in the memory 113 are processed by the one or more modules 213 of the navigation device 101. As used herein, the term module refers to an application specific integrated circuit (ASIC), an electronic circuit, a field-programmable gate arrays (FPGA), Programmable System-on-Chip (PSoC), a combinational logic circuit, and/or other suitable components that provide the described functionality. The said modules 213 when configured with the functionality defined in the present disclosure will result in a novel hardware.

In one implementation, the one or more modules 213 may include, but are not limited to a receiving module 215, a time estimate determination module 217, an events determination module 219, a feasibility determination module 221, an alert generation module 223, an event scheduling module 225 and a navigation determination module 227. The one or more modules 213 may also include other modules 229 to perform various miscellaneous functionalities of the navigation device 101. In an embodiment, the other modules 229 may include a tracking module for tracking location of the vehicle 103. It will be appreciated that such modules 213 may be represented as a single module or a combination of different modules 213.

The receiving module 215 may receive the events data associated with the user from at least the user device 119 and the user events user data server 121. In an embodiment, the infotainment unit 117 may identify the user through a specific user identity key. The receiving module 215 may connect with the user device 119 or the user events user data server 121 by using the user identity key and fetch the events data. In an embodiment, the events data may include, details of Short Message Services (SMS), Electronic Mail (Email) messages, multimedia data, calendar events and social networking content associated with the user. Further, the receiving module 215 may receive the current location details of the vehicle 103 from the infotainment unit 117 of the vehicle 103. The receiving module 215 may receive the data associated with the one or more registered service providers from the service provider server 107.

The time estimate determination module 217 may determine a time estimate to reach a location of one or more events based on the current location of the vehicle 103.

The events determination module 219 may determine the one or more events associated with the user based on at least one of, the events data and the predefined template data. The one or more events may include scheduled events and unscheduled events. In an embodiment, the predefined template data may be associated with the one or more registered service providers. The events determination module 219 may determine the one or more events by mapping the events data with the data of the one or more registered service providers. In an embodiment, the events determination module 219 may analyse the events data received from the user device 119 and the user data server 121. While mapping the events data with the data of the one or more registered service providers, the events determination module 219 may validate each events of the user with the predefined template format associated with each of the one or more service providers. In an embodiment, after receiving the predefined template format, the events determination module 219 may extract information on a number of aspects such as, type/context, time, date, and location. For example, for the type/context, the events determination module 219 may search for keyword/phrase, like 'PNR', 'see', 'meet', 'meeting', 'appointment', 'hotel' 'restaurant', 'office', 'conference', 'booking', 'see you', 'flight number', 'bus number', 'ticket', 'show time' and the like. After searching, the events determination module 219 may segregate the events in different context types, such as, entertainment, travel, official, medical and the like.

For the time aspect, the events determination module 219 may search for keyword/phrase, such as, 'am', 'pm', 'time', 'a.m.', 'p.m.', 'morning', 'evening' and the like. For the date aspect, the events determination module 219 may search the date in different formats, such as, "dd/mm/yy", "dd/mm/yyyy", "mm/dd/yy", "mm/dd/yyyy" and the like. Further, for the location aspect, the events determination module 219 may search for keyword/phrase, such as, 'at', 'place' and the like.

The feasibility determination module 221 may determine the feasibility to reach the one or more events determined for the user based on the set of parameters. The set of parameters may include, the start time of the user for an event, the one or more point of interest enroute to the event, the distance of the event from the current location of the user, the consecutive distance between two events, type of the event, estimate time for the event, the real-time traffic and weather condition at the current location and on way to the event, the real-time update on the one or more event by a registered service provider, the conflict with the scheduled event and the priority of the event. In an embodiment, the feasibility determination module 221 may determine the feasibility by identifying the events which are scheduled in the same day by comparing the event dates with the current date. Based on the comparison, the feasibility determination module 221 may find out active events, which may be scheduled post the current time, by comparing the event times with the current time. The comparison with the current time and date may filter expired events. Once active events are identified, the feasibility determination module 221 may find out events which may be subsequent to the current time by comparing the events time with each other. On identifying the events subsequent to the current time, the feasibility determination module 221 may provide location details of the events to the time estimate determination module 217 and receive the time estimate to reach the identified events from the time estimate determination module 217. Further, the feasibility determination module 221 may determine a time difference between the current time and the scheduled time of the event subsequent to the current time. The feasibility determination module 221 may compare the time determined to reach the identified events and the time difference determined between the current time and the scheduled time of the event. In case, the time difference between the scheduled event time and the current time is greater than or equal to the time estimate identified for reaching the events, the events may be feasible to reach on scheduled time. Alternatively, if the time difference between the scheduled event time and the current time is lesser than or equal to the time estimate, rescheduling of the scheduled events may be required. Based on the determination, the navigation device 101 may provide the navigation to the vehicle 103.

In an embodiment, at a later point of time, the feasibility determination module 221 may identify at least one of, the one or more point of interest added by the users, to be covered enroute to the scheduled event, the one or more conflicting scheduled events, the change in route of the scheduled event, the change in the real-time traffic condition on way to the schedule events, the change in time of the scheduled event and the real-time update on the one or more event by the registered service provider. In such cases, the feasibility determination module 221 may recalculate the feasibility of the vehicle 103 for reaching the one or more events based on the identification. For example, if the user sets one or more point of interest in an active route, the feasibility determination module 221 may recalculate the feasibility to reach the one or more events. In an embodiment, the navigation unit present in the infotainment unit 117 of the vehicle 103 may recalculate the route to reach the one or more events. The recalculated route may be received by the time estimate determination module 217 to calculate an updated time to reach the one or more events. For example, a user is routed to an event "A" initially. After some time, the user adds a location "B" to be covered on way to the event "A". In such case, the feasibility to reach the event "A" is recalculated and a time is determined to reach the event "A" after covering event "B". The time determined in such case is referred as the updated time.

Further, based on the updated time, the feasibility determination module 221 may compare and check if the updated time to the event is less than or equal to the time difference between the current time and the scheduled event time. If the updated time to event is less than or equal to the time difference, the feasibility determination module 221 may determine that addition of the one or more point of interest may be feasible. In case, the updated time is greater than the time difference between the current time and the scheduled event time, addition of the one or more point of interest may cause delay to the event.

Further, if the location of the one or more event is changed by the one or more registered service providers or any other third party, the feasibility determination module 221 may determine the feasibility to reach changed location of the one or more events. For example, when there is a change in the event location, the feasibility determination module 221 may check if the current event location is same as the updated location. If the current event location is same as the updated location, reaching the one or more events may be feasible and the feasibility determination module 221 may not take any action. If case, the current event location is not same as the updated location, the feasibility determination module 221 may check, if the time to reach the updated location is greater than, the time difference between the current time and the time of event. If the time to reach the updated location is greater, the feasibility determination module 221 may determine that reaching the event on time may be delayed due to the changed location of the event. In such case, the user may be alerted for rescheduling the event.

Further, the feasibility determination module 221 may determine the one or more conflicting events on identifying, if two or more events are scheduled at same time and events infeasible to reach based on at least one of, the distance of the events from current location, the distance between two consecutive events and the real-time traffic and weather condition at the current location and on way to the events. For example, the feasibility determination module 221 may check if there are two events which are within a time difference of 1 hour or less. If the feasibility determination module 221 finds two such events, the time to reach from the first event location to second event location may be determined. In case, the time to reach is greater than time difference between the first and second event, the feasibility determination module 221 may determine that reaching the event on time may be delayed. In such case, the user may be alerted for rescheduling the event.

Figure 2B:
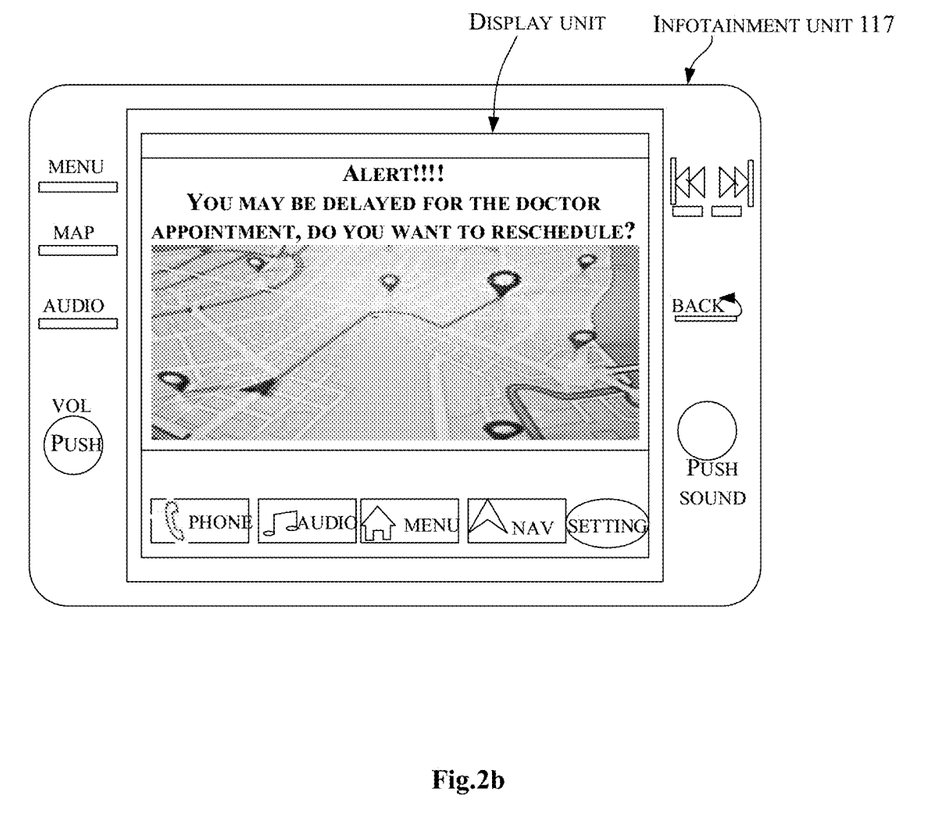
FIG. 2b shows an exemplary representation of an infotainment unit of a vehicle in accordance with some embodiments of present disclosure.

The alert generation module 223 may generate one or more alerts based on the feasibility determination to reach the one or more events. The alert generation module 223 may generate alerts whenever a rescheduling of event may be required. In an embodiment, the user may be provided with alerts when an active route is provided based feasibility. The alerts, in such case, may be provided based on the point of interest, change in time to reach destination by adding waypoints, sudden change in traffic conditions and the like. The alert generation module 223 may provide alerts to user on identifying any new event from the events data. The alert generation module 223 may provide alerts to user when one or more events may be confirmed for rescheduling. In an embodiment, the alert generation module 223 may provide only important reminders associated with one or more events to the users. In an embodiment, the alerts may be displayed on the display unit present in the infotainment unit 117 of the vehicle 103 as shown in FIG. 2b. FIG. 2b shows an exemplary representation of an infotainment unit of a vehicle in accordance with some embodiments of present disclosure.

The event scheduling module 225 may schedule the one or more events based on the feasibility of the one or more events. In an embodiment, the event scheduling module 225 may reschedule the scheduled events based on the feasibility. In an embodiment, the event scheduling module 225 may schedule the unscheduled events based on the feasibility. In an embodiment, rescheduling of the scheduled events may be required, when it is found that the user may not be able to reach the events on time. In an embodiment, the delay may be due to late start time, the distance of the event location from the current location of the user, the real-time traffic condition at the time of journey or any way point where the user may stop, such as, for fuel, food and the like.

For rescheduling the scheduled events, the event scheduling module 225 may fetch details of the events to be rescheduled. For example, the details may include, the type of the event, such as, transportation schedule like train, flight and the like, entertainment event such as, game show or movie and personal event like dinner at a restaurant or appointment at doctor's clinic. In an embodiment, rescheduling an event may always require a confirmation from the both end such as, the user and the service provider.

In an embodiment, rescheduling of events may not be feasible for all kind of events. For example, a train/flight may not wait for a particular user. Similarly, entertainment events such as, movies, game shows organized for public, may not be feasible to be rescheduled for an individual. However, personal events such as, visiting doctor, meeting friends and the like may be rescheduled. In an embodiment, the user may be alerted for rescheduling the events. The event scheduling module 225 may consider consent of the user before rescheduling the events. In case, the user denies, the event scheduling module 225 may not reschedule the events. Alternatively, if the user is willing to reschedule, the events rescheduling module 225 may communicate with the associated service provider for rescheduling. For example, the service provider may communicate using SMS, email and the like and propose a feasible time to reschedule based on an estimated time input. In an embodiment, the estimate time may be determined by the time estimate determination module 217. In an embodiment, the time estimate may be provided by the user. On receiving a confirmation from the service provider, the event scheduling module 225 may reschedule the events and notify the user about the rescheduling.

The navigation determination module 227 may determine the navigation of the vehicle 103 based on the one or more scheduled events. In an embodiment, the navigation determination module 227 may provide the route guidance and the time estimate to reach the one or more scheduled events and one or more rescheduled events.

Figure 3:
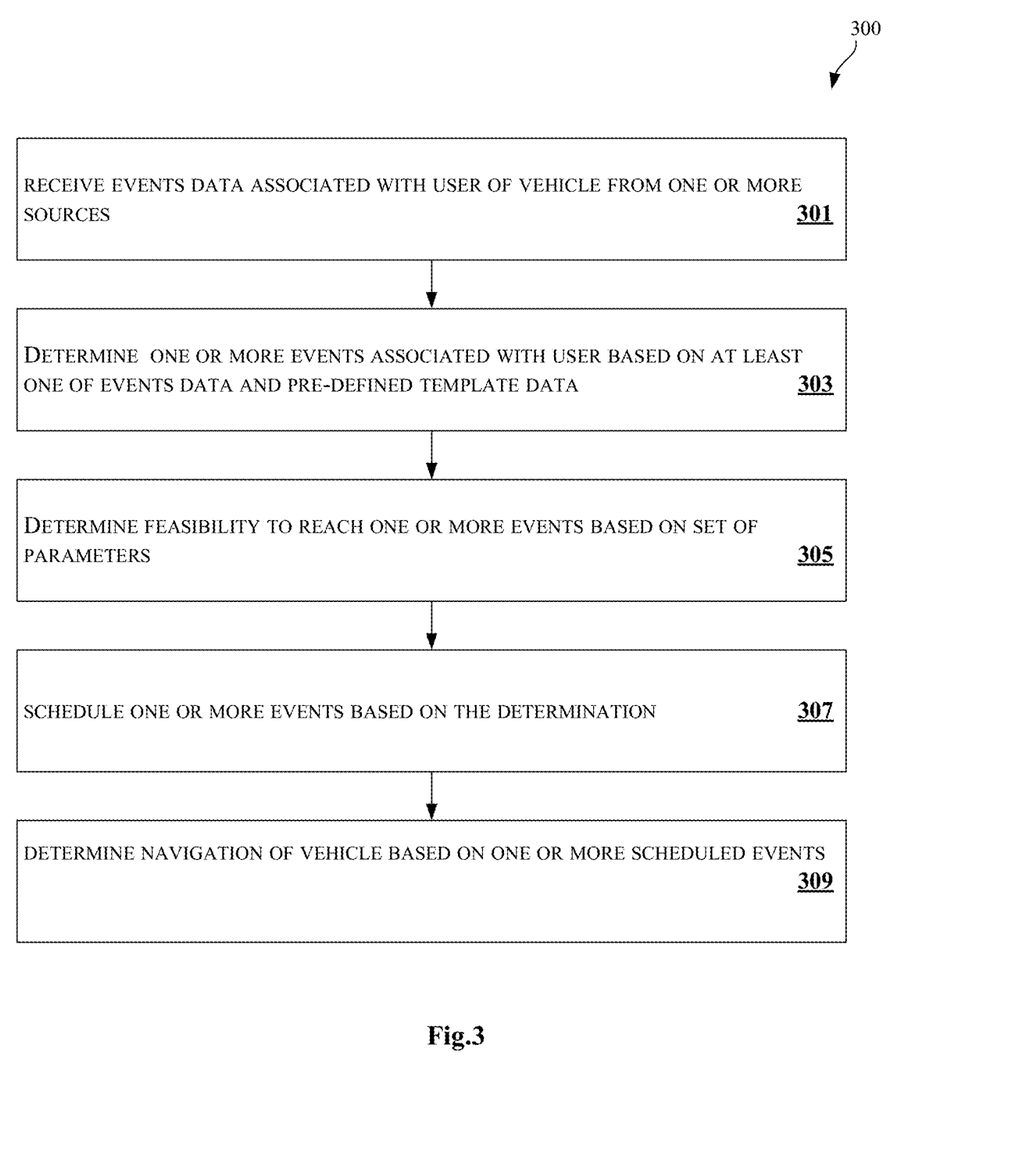
FIG. 3 illustrates a flowchart showing a method for determining navigation of a vehicle based on feasibility of events in accordance with some embodiments of present disclosure.

FIG. 3 illustrates a flowchart showing a method for determining navigation of a vehicle based on feasibility of events in accordance with some embodiments of present disclosure.

As illustrated in FIG. 3, the method 300 includes one or more blocks for determining navigation of a vehicle based on feasibility of events. The method 300 may be described in the general context of computer executable instructions. Generally, computer executable instructions can include routines, programs, objects, components, data structures, procedures, modules, and functions, which perform particular functions or implement particular abstract data types.

The order in which the method 300 is described is not intended to be construed as a limitation, and any number of the described method blocks can be combined in any order to implement the method. Additionally, individual blocks may be deleted from the methods without departing from the spirit and scope of the subject matter described herein. Furthermore, the method can be implemented in any suitable hardware, software, firmware, or combination thereof.

At block 301, events data associated with the user of the vehicle 103 are received by the receiving module 215 from the one or more sources. In an embodiment, the one or more sources may include the user device 119 and the user data server 121.

At block 303, the one or more events associated with the user, are determined by the events determination module 219 based on at least one of the events data and the pre-defined template data. In an embodiment, the pre-defined template data is associated with the one or more registered service providers.

At block 305, the feasibility to reach the one or more events is determined by the feasibility determination module 221 based on the set of parameters. In an embodiment, the set of parameters may include start time of the user for an event, one or more point of interest enroute to the event, distance of the event from the current location of the user, consecutive distance between two events, type of the event, estimate time for the scheduled event, real-time traffic and weather condition at the current location and on way to the event, real-time update on the one or more event by a registered service provider, conflict with the scheduled event and the priority of the event.

At block 307, the one or more events are determined by the event scheduling module 225 based on the determination.

At block 309, the navigation of the vehicle 103 is determined by the navigation determination module 227 based on the one or more scheduled events.

Figure 4A:
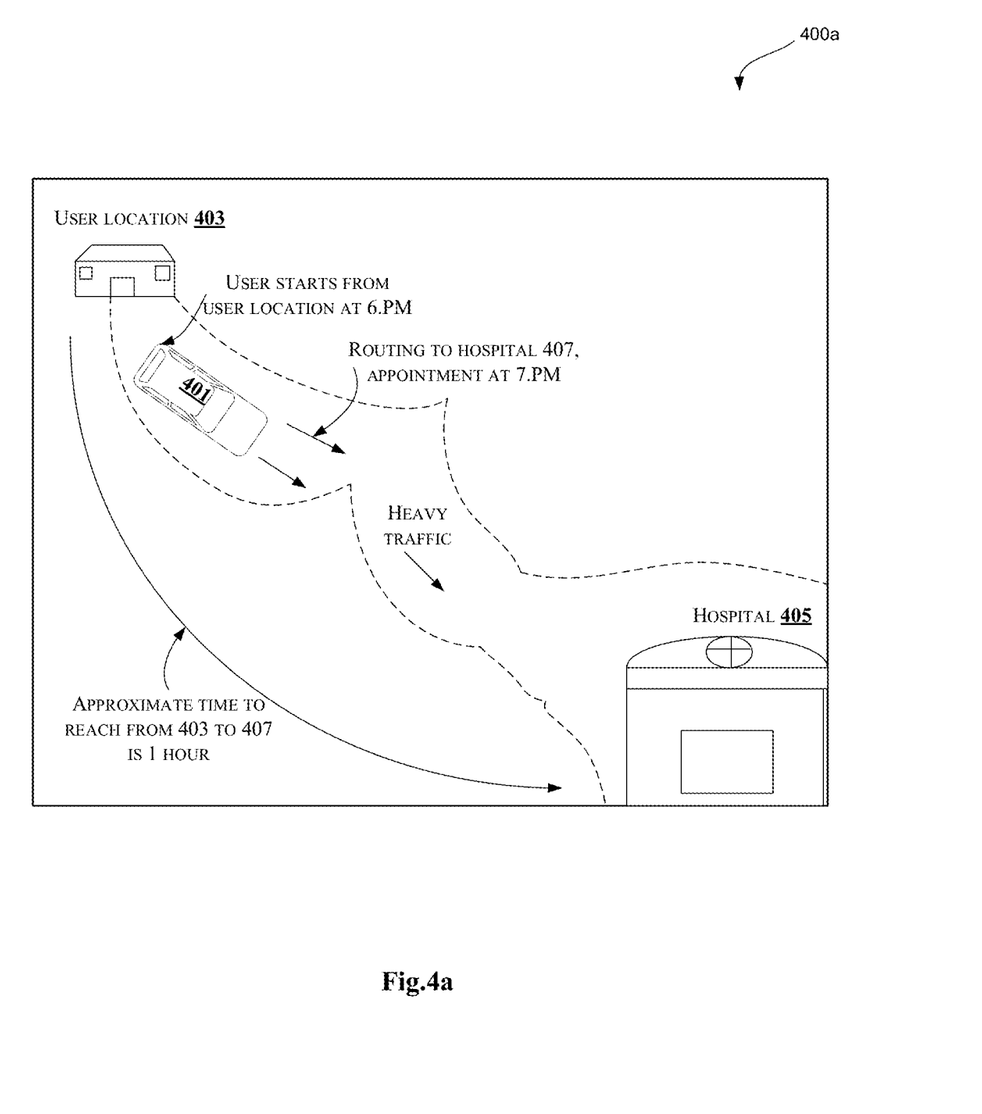
FIG. 4a and FIG. 4b show exemplary representations for determining navigation of a vehicle based on feasibility of events in accordance with some embodiments of the present disclosure.
Figure 4B:
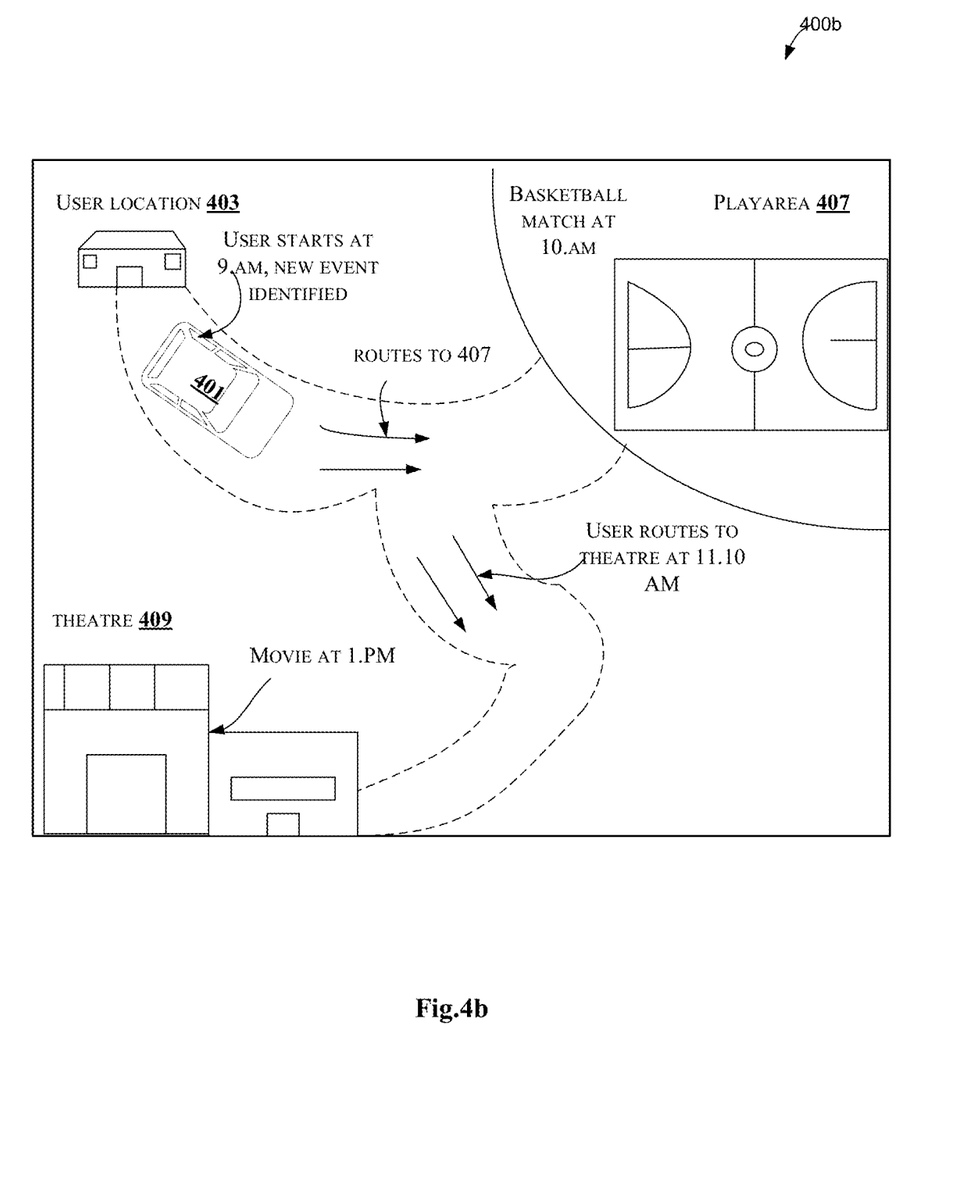

FIG. 4a and FIG. 4b show exemplary representations for determining navigation of a vehicle based on feasibility of events in accordance with some embodiments of the present disclosure.

As shown in FIG. 4a, the environment 400a illustrates a scenario of navigating a vehicle according to an exemplary embodiment of the present disclosure. The environment 400a in FIG. 4a includes a vehicle i.e., a car 401, a user location 403 and a hospital 405. A person skilled in the art would understand that FIG. 4a is an exemplary embodiment and the present disclosure may also include plurality of other locations. The car 401 of a user may include the navigation unit 101. In an embodiment, the navigation unit 101 may be connected to the car 401 (not shown explicitly in FIG. 4a). Further, the car 401 may be connected to the user device 119 and the user data server 121 (not shown explicitly in FIG. 4a). Initially, the user of the car 401 may be at the user location 403. On start-up of the navigation device 101, the navigation device 101 may receive events data associated with the user of the car 401. In an embodiment, the events data may include details of Short Message Services (SMS), electronic mail messages, multimedia data, calendar events and social networking content associated with the user. For example, the events data may be received from the user data server. In this example, the user of the car 401 received the electronic mail message from the user data server 121. Based on the electronic mail message, the navigation device 101 may determine one or more events associated with the user for the day. The navigation device 101 analyses the electronic email message and may determine content, type, time and location for the event.

For example, based on the analysis, the navigation device 101 present in the car 401 may identify terms such as, "hospital", "time", "pm", "location name" and the like. Based on the determination, the navigation device 101 may determine that the user of the car 401 has a doctor's appointment for today at 7:00 PM at the hospital 405. The navigation device 101 determines the feasibility of the user to reach the hospital 405 at the scheduled time. Under normal circumstances, to reach the hospital 405 from the user location 403, the user may take approximately one hour. In such case, the user may need to start from the user location 403 by 5:30 P.M, considering traffic conditions. Suppose, the user of the car 401 as shown in FIG. 4a, starts at 6:00 PM from the user location 403. The navigation device 101 determines the feasibility of the user of the car 401 based on the set of parameters. In an embodiment, the set of parameters may include start time of the user for an event, one or more point of interest enroute to the event, the distance of the event from a current location of the user, consecutive distance between two events, type of the event, estimate time for the scheduled event, real-time traffic and weather condition at the current location and on way to the event, real-time update on the one or more event by a registered service provider, conflict with the scheduled event and priority of the event. In the current scenario, the navigation device 101 determines a very heavy traffic on way to the hospital 405 location as indicated in FIG. 4a. In such case, the user of the car 401 cannot reach the hospital 405 on time. On determining infeasibility to reach the hospital 405, the navigation device 101 may provide an alert to the user on an infotainment unit of the car 401 (not shown explicitly). In an embodiment, the alert may also be provided on the user device 119. In an embodiment, the navigation device 101 may identify a time estimate to reach the hospital 405 under the heavy traffic condition. For example, the alert may include "it seems hard to reach in time, would you like to reschedule the appointment by an hour?". In such situation, the user of the car 401 may accept to reschedule the appointment of doctor. Further, the navigation device 101 may check with the hospital 405 for rescheduling the appointment of the user from 7.PM to 8.PM. In case, the hospital 405 accepts the request, the navigation device 101 may reschedule the appointment and notify the user of the car 401. In an embodiment, the navigation device 101 may provide route guidance and time estimate to user for reaching the hospital 405. On receiving the route guidance and time estimate, the user of the car 401 may navigate to the hospital 405.

Further, FIG. 4b illustrates an exemplary representation for determining navigation of a vehicle on identifying a new unscheduled event. The environment 400b in FIG. 4b includes the car 401, the user location 403, a play area 407 and a theatre 409. Suppose the user of the car 401 starts from the user location 403 at 9.AM. For example, the user is visiting the theatre 409 for watching a movie at 1.PM. The navigation device 101 connected to the car 401 may receive the events data associated with the user. On receiving the events data, the navigation device 101 may identify that the user has a movie show at 1 PM at the theatre 409. In addition, the user may have also received a SMS from a friend for a basketball match at 10.AM for an hour at the play area 407. The navigation device 101 may identify the event, i.e. basketball match from the SMS received by the user on the user device. In such case, the navigation device 101 may determine the feasibility of the user to attend the basketball match at 10.AM at the play area 407. The feasibility to reach the play area 407 may be determined based on the set of parameters. For example, the navigation device 101 may determine that it is feasible for the user to reach the play area 407 and play basketball for an hour without affecting the plan of movie show at 1 PM. In such case, the user of the car 401 may schedule the basketball match. The navigation device 101 may provide the route guidance to reach the play area 407. In addition, the navigation device 101 may also indicate the time estimate and route guidance to reach the theatre 409 at the scheduled time.

Figure 5:
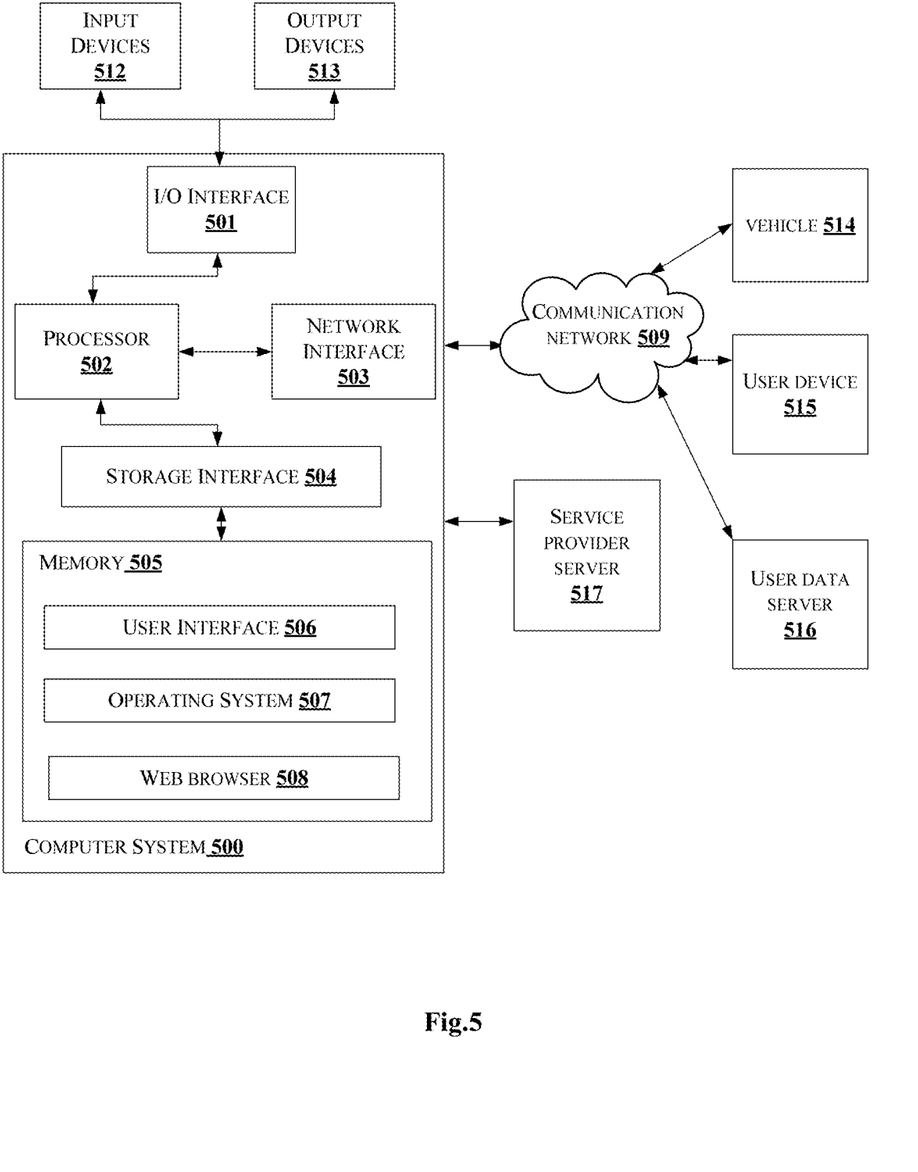
FIG. 5 illustrates a block diagram of an exemplary computer system for implementing embodiments consistent with the present disclosure.

FIG. 5 illustrates a block diagram of an exemplary computer system 500 for implementing embodiments consistent with the present disclosure. In an embodiment, the computer system 500 may be used to implement the navigation device 101. The computer system 500 may include a central processing unit ("CPU" or "processor") 502. The processor 502 may include at least one data processor for determining navigation of a vehicle based on feasibility of events. The processor 502 may include specialized processing units such as, integrated system (bus) controllers, memory management control units, floating point units, graphics processing units, digital signal processing units, etc.

The processor 502 may be disposed in communication with one or more input/output (I/O) devices (not shown) via I/O interface 501. The I/O interface 501 may employ communication protocols/methods such as, without limitation, audio, analog, digital, monoaural, RCA, stereo, IEEE-1394, serial bus, universal serial bus (USB), infrared, PS/2, BNC, coaxial, component, composite, digital visual interface (DVI), high-definition multimedia interface (HDMI), RF antennas, S-Video, VGA, IEEE 802.n /b/g/n/x, Bluetooth, cellular (e.g., code-division multiple access (CDMA), high-speed packet access (HSPA+), global system for mobile communications (GSM), long-term evolution (LTE), WiMax, or the like), etc.

Using the I/O interface 501, the computer system 500 may communicate with one or more I/O devices. For example, the input device may be an antenna, keyboard, mouse, joystick, (infrared) remote control, camera, card reader, fax machine, dongle, biometric reader, microphone, touch screen, touchpad, trackball, stylus, scanner, storage device, transceiver, video device/source, etc. The output device may be a printer, fax machine, video display (e.g., cathode ray tube (CRT), liquid crystal display (LCD), light-emitting diode (LED), plasma, Plasma display panel (PDP), Organic light-emitting diode display (OLED) or the like), audio speaker, etc.

In some embodiments, the computer system 500 consists of a navigation device 101. The processor 502 may be disposed in communication with the communication network 509 via a network interface 503. The network interface 503 may communicate with the communication network 509. The network interface 503 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 509 may include, without limitation, a direct interconnection, local area network (LAN), wide area network (WAN), wireless network (e.g., using Wireless Application Protocol), the Internet, etc. Using the network interface 503 and the communication network 509, the computer system 500 may communicate with a vehicle 514, a user device 515 and a user data server 516. The computer system 500 is connected to a service provider server 517. The network interface 503 may employ connection protocols include, but not limited to, direct connect, Ethernet (e.g., twisted pair 10/100/1000 Base T), transmission control protocol/internet protocol (TCP/IP), token ring, IEEE 802.11a/b/g/n/x, etc.

The communication network 509 includes, but is not limited to, a direct interconnection, an e-commerce network, a peer to peer (P2P) network, local area network (LAN), wide area network (WAN), wireless network (e.g., using Wireless Application Protocol), the Internet, Wi-Fi and such. The first network and the second network may either be a dedicated network or a shared network, which represents an association of the different types of networks that use a variety of protocols, for example, Hypertext Transfer Protocol (HTTP), Transmission Control Protocol/Internet Protocol (TCP/IP), Wireless Application Protocol (WAP), etc., to communicate with each other. Further, the first network and the second network may include a variety of network devices, including routers, bridges, servers, computing devices, storage devices, etc.

In some embodiments, the processor 502 may be disposed in communication with a memory 505 (e.g., RAM, ROM, etc. not shown in FIG. 5) via a storage interface 504. The storage interface 504 may connect to memory 505 including, without limitation, memory drives, removable disc drives, etc., employing connection protocols such as, serial advanced technology attachment (SATA), Integrated Drive Electronics (IDE), IEEE-1394, Universal Serial Bus (USB), fiber channel, Small Computer Systems Interface (SCSI), etc. The memory drives may further include a drum, magnetic disc drive, magneto-optical drive, optical drive, Redundant Array of Independent Discs (RAID), solid-state memory devices, solid-state drives, etc.

The memory 505 may store a collection of program or database components, including, without limitation, user interface 506, an operating system 507 etc. In some embodiments, computer system 500 may store user/application data 506, such as, the data, variables, records, etc., as described in this disclosure. Such databases may be implemented as fault-tolerant, relational, scalable, secure databases such as Oracle or Sybase.

The operating system 507 may facilitate resource management and operation of the computer system 700. Examples of operating systems include, without limitation, APPLE MACINTOSHR OS X, UNIXR, UNIX-like system distributions (E.G., BERKELEY SOFTWARE DISTRIBUTION™ (BSD), FREEBSD™, NETBSD™, OPENBSD™, etc.), LINUX DISTRIBUTIONS™ (E.G., RED HAT™, UBUNTU™, KUBUNTU™, etc.), IBM™ OS/2, MICROSOFT™ WINDOWS™ (XP™, VISTA™/7/8, 10 etc.), APPLER IOS™, GOOGLER ANDROID™, BLACKBERRYR OS, or the like.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include Random Access Memory (RAM), Read-Only Memory (ROM), volatile memory, non-volatile memory, hard drives, CD ROMs, DVDs, flash drives, disks, and any other known physical storage media.

The present disclosure provides a navigation for vehicle of a user based on feasibility of events associated with the user.

An embodiment of the present disclosure does not require user's initial interaction to feed data for setting reminders.

In an embodiment of the present disclosure, user's schedule is generated from booking acknowledgements available in user device.

An embodiment of the present disclosure is a standalone application, which works with any vehicle infotainment system.

An embodiment of the present disclosure provides better user experience in managing events or appointments while driving the vehicle.

An embodiment of the present disclosure facilitates contextual driver experience.

An embodiment of the present disclosure provides advanced driving assistance through effective trip prediction.

An embodiment of the present disclosure comprises intelligence to understand when to remind users about events and remove chances of unnecessary reminders and thus reduces driver distraction.

An embodiment of the present disclosure is vehicle specific and may run on head unit of the vehicle. Therefore, any user who pairs a user device with the vehicle head unit may determine navigation of the vehicle based on their schedule.

The described operations may be implemented as a method, system or article of manufacture using standard programming and/or engineering techniques to produce software, firmware, hardware, or any combination thereof. The described operations may be implemented as code maintained in a "non-transitory computer readable medium", where a processor may read and execute the code from the computer readable medium. The processor is at least one of a microprocessor and a processor capable of processing and executing the queries. A non-transitory computer readable medium may include media such as magnetic storage medium (e.g., hard disk drives, floppy disks, tape, etc.), optical storage (CD-ROMs, DVDs, optical disks, etc.), volatile and non-volatile memory devices (e.g., EEPROMs, ROMs, PROMs, RAMs, DRAMs, SRAMs, Flash Memory, firmware, programmable logic, etc.), etc. Further, non-transitory computer-readable media include all computer-readable media except for a transitory. The code implementing the described operations may further be implemented in hardware logic (e.g., an integrated circuit chip, Programmable Gate Array (PGA), Application Specific Integrated Circuit (ASIC), etc.).

Still further, the code implementing the described operations may be implemented in "transmission signals", where transmission signals may propagate through space or through a transmission media, such as, an optical fiber, copper wire, etc. The transmission signals in which the code or logic is encoded may further include a wireless signal, satellite transmission, radio waves, infrared signals, Bluetooth, etc. The transmission signals in which the code or logic is encoded is capable of being transmitted by a transmitting station and received by a receiving station, where the code or logic encoded in the transmission signal may be decoded and stored in hardware or a non-transitory computer readable medium at the receiving and transmitting stations or devices. An "article of manufacture" includes non-transitory computer readable medium, hardware logic, and/or transmission signals in which code may be implemented. A device in which the code implementing the described embodiments of operations is encoded may include a computer readable medium or hardware logic. Of course, those skilled in the art will recognize that many modifications may be made to this configuration without departing from the scope of the technology, and that the article of manufacture may include e suitable information bearing medium known in the art.

The terms "an embodiment", "embodiment", "embodiments", "the embodiment", "the embodiments", "one or more embodiments", "some embodiments", and "one embodiment" mean "one or more (but not all) embodiments of the technology" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

A description of an embodiment with several components in communication with each other does not imply that all such components are required. On the contrary, a variety of optional components are described to illustrate the wide variety of possible embodiments of the technology.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the technology need not include the device itself.

The illustrated operations of FIG. 3 show certain events occurring in a certain order. In alternative embodiments, certain operations may be performed in a different order, modified or removed. Moreover, steps may be added to the above described logic and still conform to the described embodiments. Further, operations described herein may occur sequentially or certain operations may be processed in parallel. Yet further, operations may be performed by a single processing unit or by distributed processing units.

Finally, the language used in the specification has been principally selected for readability and instructional purposes, and it may not have been selected to delineate or circumscribe the inventive subject matter. It is therefore intended that the scope of the technology be limited not by this detailed description, but rather by any claims that issue on an application based here on. Accordingly, the disclosure of the embodiments of the technology is intended to be illustrative, but not limiting, of the scope of the technology, which is set forth in the following claims.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. A method of determining navigation of a vehicle based on feasibility of events, the method comprising:
   receiving, by a navigation device, events data associated with a user of the vehicle from one or more sources;
   determining, by the navigation device, one or more events associated with the user, based on the events data and pre-defined template data, wherein the pre-defined template data comprises one or more event information formats corresponding to one or more registered service providers, wherein determining the one or more events comprises validating the one or more events by mapping the events data with the one or more event information formats, wherein the pre-defined template data is fetched from the one or more service providers based on a current location of the user, and wherein each of the one or more event information formats comprises at least one of an event context format, an event schedule format, and an event location format;

determining in real-time, by the navigation device, feasibility to reach the one or more events based on a set of parameters;

scheduling, by the navigation device, the one or more events based on the determination; and determining, by the navigation device, navigation of the vehicle based on the one or more scheduled events.

2. The method as claimed in claim 1, wherein the events data comprises at least one of, details of Short Message Services (SMS), electronic mail messages, multimedia data, calendar events or social networking content associated with the user.

3. The method as claimed in claim 1, wherein the set of parameters comprises at least one of a start time of the user for an event, one or more point of interest enroute to the event, a distance of the event from a current location of the user, consecutive distance between two events, a type of event, an estimate time for event, real-time traffic and weather condition at the current location and on way to the event, a real-time update on the one or more events by a registered service provider, a conflict with the scheduled event, or a priority of the event.

4. The method as claimed in claim 1, further comprising, recalculating the feasibility of the vehicle for reaching the one or more scheduled events on identifying at least one of one or more point of interest to be covered enroute to the scheduled event, one or more conflicting scheduled events, a change in route of the scheduled event, a change in the real-time traffic condition on way to the scheduled events, a change in time of the scheduled event, or a real-time update on the one or more events by a registered service provider.

5. The method as claimed in claim 4, wherein the one or more conflicting scheduled events comprise at least one of events scheduled at same time, or events infeasible to reach based on at least one of:
   a distance of the scheduled event from current location,
   a distance between two consecutive scheduled events, or
   a real-time traffic and weather condition at the current location and on way to the scheduled events.

6. The method as claimed in claim 1, wherein scheduling the one or more events comprises rescheduling one or more scheduled events based on the feasibility.

7. The method as claimed in claim 1 further comprising fetching service provider data associated with the one or more registered service providers in the current location of the user from a service provider server, wherein the service provider data comprises the pre-defined template data.

8. The method as claimed in claim 1 further comprising, providing a route guidance and time estimate to reach one or more scheduled events and one or more rescheduled events.

9. The method as claimed in claim 1, wherein the one or more sources comprise at least one of, a connected user device or a user data server.

10. A navigation device for determining navigation of a vehicle based on feasibility of events, comprising:
   a processor; and
   a memory communicatively coupled to the processor, wherein the memory stores processor instructions, which, on execution, causes the processor to:
      receive events data associated with a user of the vehicle from one or more sources;
      determine one or more events associated with the user, based on the events data and pre-defined template data, wherein the pre-defined template data comprises one or more event information formats corresponding to one or more registered service providers, wherein determining the one or more events comprises validating the one or more events by mapping the events data with the one or more event information formats, wherein the pre-defined template data is fetched from the one or more service providers based on a current location of the user, and wherein each of the one or more event information formats comprises at least one of an event context format, an event schedule format, and an event location format;
      determine in real-time feasibility to reach the one or more events based on a set of parameters;
      schedule the one or more events based on the determination; and
      determine navigation of the vehicle based on the one or more scheduled events.

11. The navigation device as claimed in claim 10, wherein the events data comprises at least one of, details of Short Message Services (SMS), electronic mail messages, multimedia data, calendar events or social networking content associated with the user.

12. The navigation device as claimed in claim 10, wherein the set of parameters comprises at least one of a start time of the user for an event, one or more point of interest enroute to the event, a distance of the event from a current location of the user, consecutive distance between two events, a type of event, an estimate time for event, real-time traffic and weather condition at the current location and on way to the event, a real-time update on the one or more events by a registered service provider, a conflict with the scheduled event, or a priority of the event.

13. The navigation device as claimed in claim 10, wherein the processor recalculates the feasibility of the vehicle for reaching the one or more scheduled events on identifying at least one of one or more point of interest to be covered enroute to the scheduled event, one or more conflicting scheduled events, a change in route of the scheduled event, a change in the real-time traffic condition on way to the schedule scheduled events, a change in time of the scheduled event, or a real-time update on the one or more events by a registered service provider.

14. The navigation device as claimed in claim 13, wherein the one or more conflicting scheduled events comprise at least one of events scheduled at same time, or events infeasible to reach based on at least one of:
   a distance of the scheduled event from current location,
   a distance between two consecutive scheduled events, or
   a real-time traffic and weather condition at the current location and on way to the scheduled events.

15. The navigation device as claimed in claim 10, wherein scheduling the one or more events comprises rescheduling one or more scheduled events based on the feasibility.

16. The navigation device as claimed in claim 10, wherein the processor fetches service provider data associated with the one or more registered service providers in the current location of the user from a service provider server, wherein the service provider data comprises the pre-defined template data.

17. The navigation device as claimed in claim 10, wherein the processor provides a route guidance and time estimate to reach one or more scheduled events and one or more rescheduled events.

18. The navigation device as claimed in claim 10, wherein the one or more sources comprise at least one of, a connected user device or a user data server.

19. A non-transitory computer readable medium including instructions stored thereon that when processed by at least one processor cause a navigation device to perform operations comprising:

receiving events data associated with a user of the vehicle from one or more sources;

determining one or more events associated with the user, based on the events data and pre-defined template data, wherein the pre-defined template data comprises one or more event information formats corresponding to one or more registered service providers, wherein determining the one or more events comprises validating the one or more events by mapping the events data with the one or more event information formats, wherein the pre-defined template data is fetched from the one or more service providers based on a current location of the user, and wherein each of the one or more event information formats comprises at least one of an event context format, an event schedule format, and an event location format;

determining in real-time, feasibility to reach the one or more events based on a set of parameters;

scheduling the one or more events based on the determination; and determining navigation of the vehicle based on the one or more scheduled events.

20. The medium as claimed in claim 19, wherein the events data comprises at least one of, details of Short Message Services (SMS), electronic mail messages, multimedia data, calendar events or social networking content associated with the user.

21. The medium as claimed in claim 19, wherein the set of parameters comprises at least one of a start time of the user for an event, one or more point of interest enroute to the event, a distance of the event from a current location of the user, consecutive distance between two events, a type of event, an estimate time for event, real-time traffic and weather condition at the current location and on way to the event, a real-time update on the one or more events by a registered service provider, a conflict with the scheduled event, or a priority of the event.

22. The medium as claimed in claim 19, further comprising, recalculating the feasibility of the vehicle for reaching the one or more scheduled events on identifying at least one of one or more point of interest to be covered enroute to the scheduled event, one or more conflicting scheduled events, a change in route of the scheduled event, a change in the real-time traffic condition on way to the schedule scheduled events, a change in time of the scheduled event, or a real-time update on the one or more events by a registered service provider.

23. The medium as claimed in claim 22, wherein the one or more conflicting scheduled events comprise at least one of events scheduled at same time, or events infeasible to reach based on at least one of:

a distance of the scheduled event from current location, a distance between two consecutive scheduled events, or a real-time traffic and weather condition at the current location and on way to the scheduled events.

24. The medium as claimed in claim 19, wherein scheduling the one or more events comprises rescheduling one or more scheduled events based on the feasibility.

25. The medium as claimed in claim 19 further comprising fetching service provider data associated with the one or more registered service providers in the current location of the user from a service provider server, wherein the service provider data comprises the pre-defined template data.

26. The medium as claimed in claim 19 further comprising, providing a route guidance and time estimate to reach one or more scheduled events and one or more rescheduled events.

27. The medium as claimed in claim 19, wherein the one or more sources comprise at least one of, a connected user device or a user data server.

* * * * *